(12) United States Patent
Burkhead

(10) Patent No.: US 6,530,249 B1
(45) Date of Patent: Mar. 11, 2003

(54) HITCH BALL LOCKING PLATE

(76) Inventor: Robert G. Burkhead, 819 Boone White Rd., Leitchfield, KY (US) 42754

( * ) Notice: Subject to any disclaimer, the term of this patent is extended or adjusted under 35 U.S.C. 154(b) by 0 days.

(21) Appl. No.: 10/023,503

(22) Filed: Dec. 13, 2001

(51) Int. Cl.[7] .............................................. E05B 73/00
(52) U.S. Cl. ................................ 70/14; 70/232; 70/258; 280/507
(58) Field of Search ........................... 70/14, 229–232, 70/258; 280/416.1, 507, 509, 511, 512

(56) References Cited

U.S. PATENT DOCUMENTS

| | | | | |
|---|---|---|---|---|
| 2,571,349 A | * | 10/1951 | Eckles ........................ | 70/14 X |
| 2,785,564 A | * | 3/1957 | Rossi .......................... | 70/232 |
| 3,237,969 A | * | 3/1966 | Geresy ........................ | 280/507 |
| 3,391,555 A | * | 7/1968 | Mamo ......................... | 70/258 |
| 4,066,231 A | | 1/1978 | Bahner et al. | |
| 4,141,233 A | * | 2/1979 | Reyes ......................... | 70/232 |
| 4,212,175 A | | 7/1980 | Zakow | |
| 4,239,430 A | | 12/1980 | Groene | |
| 4,305,266 A | | 12/1981 | Lockwood | |
| 4,538,827 A | * | 9/1985 | Plifka ......................... | 70/14 X |
| 4,648,618 A | * | 3/1987 | Utman et al. ............. | 70/258 X |
| 4,691,935 A | | 9/1987 | Brandt | |
| 4,730,841 A | * | 3/1988 | Ponder ........................ | 70/258 X |
| 4,776,607 A | * | 10/1988 | Richter et al. ............. | 280/507 |
| 5,018,759 A | * | 5/1991 | Villalon et al. ............ | 280/507 |
| 5,052,203 A | * | 10/1991 | Van Cuyk ................... | 70/232 |
| 5,094,423 A | * | 3/1992 | Almquist et al. .......... | 70/58 X |
| 5,147,096 A | * | 9/1992 | Rogers ....................... | 280/507 |
| 5,297,407 A | * | 3/1994 | Tarr ............................ | 70/232 |
| 5,421,601 A | * | 6/1995 | Hinze et al. ............... | 70/232 X |
| 5,700,024 A | * | 12/1997 | Upchurch ................... | 280/507 |
| 6,018,968 A | * | 2/2000 | Sides .......................... | 70/14 |
| 6,135,482 A | * | 10/2000 | Larkin ........................ | 280/416.1 |
| 6,139,043 A | * | 10/2000 | Gries et al. ................ | 280/511 X |
| 6,149,359 A | | 11/2000 | Cardona | |
| 6,155,590 A | * | 12/2000 | Herrera et al. ............. | 280/511 |
| 6,217,054 B1 | * | 4/2001 | Klimek et al. ............. | 280/511 |
| 6,393,874 B1 | * | 5/2002 | Zapushek et al. .......... | 70/14 |
| 6,406,052 B1 | * | 6/2002 | Bale ........................... | 280/507 |
| 6,412,313 B1 | * | 7/2002 | Bernstrom .................. | 70/14 |
| 6,412,314 B1 | * | 7/2002 | Jenks .......................... | 70/14 |

* cited by examiner

Primary Examiner—Suzanne Dino Barrett
(74) Attorney, Agent, or Firm—James E. Cole; Middleton Reutlinger

(57) ABSTRACT

A hitch ball locking plate for securing equipment in the bed of a truck, a trailer, or the like. The hitch ball locking plate comprises a first plate having a first guiding aperture. The first plate further comprises a second plate normal to the first plate and extending across the first plate. The second plate has a substantially semi-circular removed portion in communication with the first guiding aperture. Pivotably connected to the first plate is a locking bar which locks the first and second plate to a hitch ball in the bed of a truck, trailer, or the like. From this position, equipment and goods can be locked to the plate for security.

28 Claims, 3 Drawing Sheets

HITCH BALL LOCKING PLATE

BACKGROUND OF THE INVENTION

1. Technical Field of the Invention

The present invention relates generally to a locking plate. More particularly the invention relates to a locking plate for a hitch ball mounted in the bed of a truck or trailer to which items can be secured such as lawn mowers, power equipment or any other equipment which might be easily stolen from the back of the truck or trailer if not secured.

2. Description of the Related Art

Many truck owners have a bedliner installed the bed of their truck. These bedliners protect the finish of the bed from abrasions caused by hauling materials therein. However, many of these bedliners cover holes that were placed in the bed of the truck for locking goods therein. Additionally, many of the truck manufacturers have stopped placing holes securing means in the metal beds of their trucks which could be used to secure goods to the therein. For these reasons new truck buyers are not afforded a way to secure goods within the bed of a truck which raises the possibility of theft of the goods placed therein. In the same way, people who use flat bed trailers often have difficulty securing or locking goods within the trailer and protecting them from theft.

In view of the deficiencies in known means for securing goods within a truck bed, it is apparent that a design is needed allowing a user to secure goods within the bed of a truck or a trailer. It is also preferable that the design allow securing of goods in a locked manner thereby reducing the incidence of theft of, for example, equipment from the truck or trailer.

SUMMARY OF THE INVENTION

It is an object of the present invention to provide a locking plate.

It is a further objective of this invention to provide a locking plate for a hitch ball mounted to the bed of a truck or trailer.

It is still a further objective of this invention to provide a locking plate for securing removable goods to the bed of a truck while the plate is locked to a hitch ball installed to the bed of the truck or trailer.

An even further object of the present invention is to provide a platform for securing valuable items to the hitch ball of a vehicle, the platform removably affixed to the hitch ball.

One embodiment of a hitch ball locking plate, comprising a first plate having a centrally located positioning aperture having a wide and a narrow portion therein, a locking tab adjacent a narrow portion of the first aperture, and a locking bar pivotably attached to the first plate is described herein. The locking bar and locking tab each have opposed curved and beveled edges for positioning against a hitch ball. The hitch ball locking plate further comprises a second plate integral with the first plate and normal to the first plate. The second plate is centrally aligned across the first plate and above the narrow portion of the first aperture. The second plate has at least one aperture and one substantially semi-circular removed portion. The substantially semi-circular removed portion is operably communicating with the narrow portion of the guiding aperture.

The hitch ball locking plate is further comprising a first lock aperture in the first plate and a second lock aperture on the locking bar in alignment with the first locking bar aperture. A lock can be placed through the first and second lock apertures to secure the locking plate to a hitch ball.

All of the above outlined objectives are to be understood as exemplary only and many more objectives of the invention may be gleaned from the disclosure herein. Therefore, no limiting interpretation of the objectives noted is to be understood without further reading of the entire specification, claims, and drawings included herewith.

BRIEF DESCRIPTION OF THE DRAWINGS

The aspects and advantages of the present invention will be better understood when the detailed description of the preferred embodiment is taken in conjunction with the accompanying drawings, in which.

DETAILED DESCRIPTION OF THE PREFERRED EMBODIMENT

Figure 1:
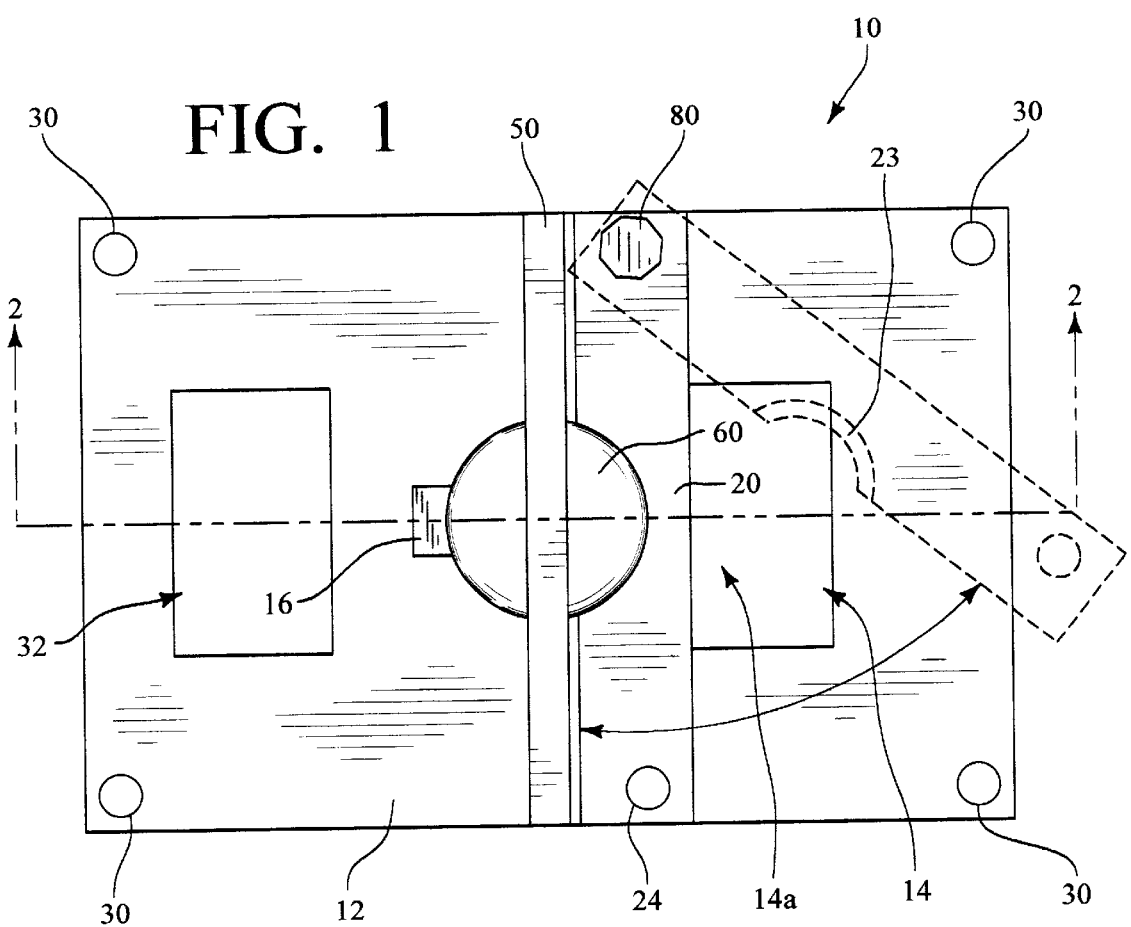
FIG. 1 shows a top view of the hitch ball locking plate of the present invention.

The present invention will now be described in conjunction with the drawings, referring initially to FIGS. 1 and 3, which show a hitch ball locking plate 10 for mounting to a hitch ball 60, for instance a gooseneck ball hitch, in a flat bed truck, pick-up truck, or flat bed trailer (not shown).

Figure 4:
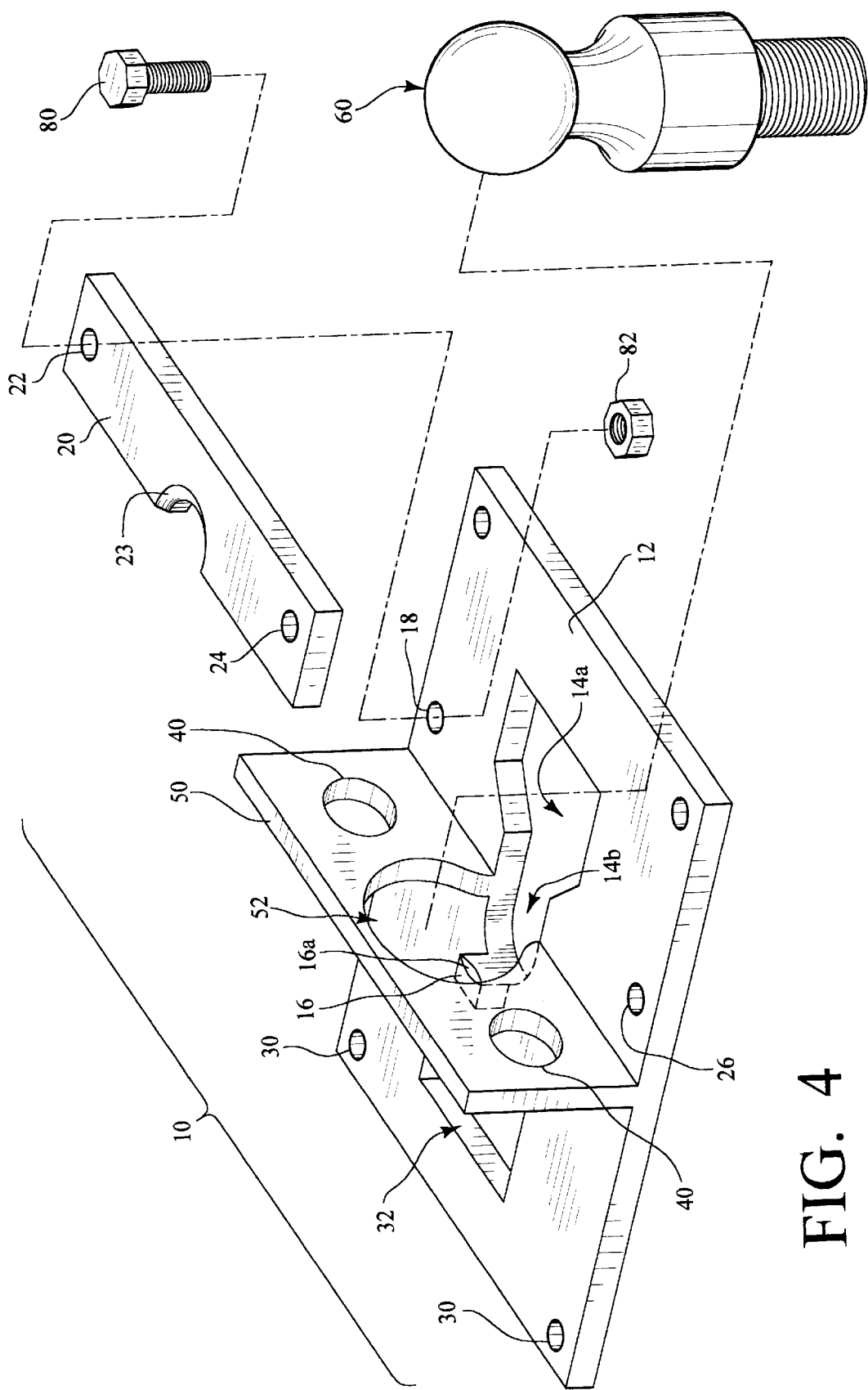

The hitch ball locking plate 10 comprises a first plate 12 preferably formed of steel and having a first, positioning, or guiding aperture 14. The first plate 12 is substantially rectangular in the described embodiment, but may vary in shape. Preferably, the first plate 12 has a size of about 10"×11"×⅜", but may vary depending on the application. The first positioning or guiding aperture 14 has two portions, a wide portion 14a and a narrow portion 14b as best shown in FIG. 4. The hitch ball locking plate 10 must be positioned over a hitch ball 60 through the wide portion 14a before moving the locking plate 10 such that hitch ball 60 is positioned in the narrow portion 14b for proper locking. The narrow portion 14b of guiding or positioning aperture 14 prevents hitch ball locking plate 10 from slipping over the head of hitch ball 60 when the device is in a closed or locked position. The wide portion 14a of guiding aperture 14 is preferably sized to fit a ratchet strap hook. The ratchet strap can be used to secure goods having a length greater than the bed of the truck such as boards, pipes, and the like. Alternatively, aperture 14 may be used to in conjunction with chains, ropes, or cables to secure goods to the hitch ball locking plate 10.

Figure 2:
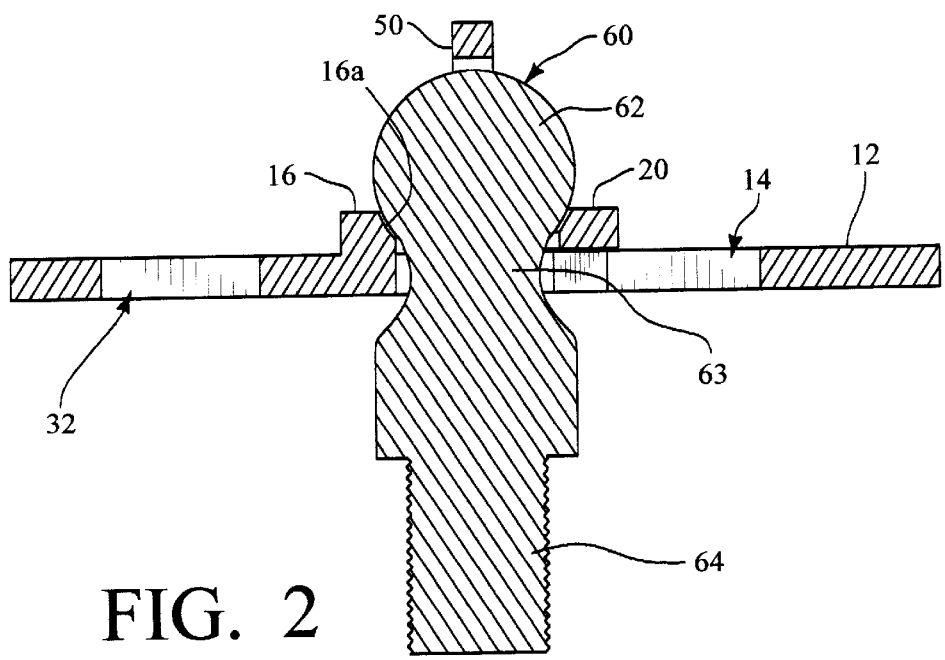
FIG. 2 shows a sectional view along line 2—2 of FIG. 1.

Returning to FIG. 1, adjacent the narrow portion 14b of the first plate 12 and on a top surface thereof, is a locking tab 16. The locking tab 16 preferably has a substantially rectangular block type shape. Along an upper edge and adjacent the narrow portion 14b of the locking tab 16 is a curved beveled edge 16a as best seen in FIG. 4. The curved beveled edge 16a provides a close fit against the hitch ball 60 when the ball hitch locking plate 10 is in a locked position, as shown in FIG. 2. The locking tab 16 is preferably derived from of a piece of flat bar stock, although this size and shape may vary. As one skilled in the art will recognize the locking tab 16 provides a mechanism for placing a beveled edge against the hitch ball 60 thus allowing a tight and secure fit.

A second aperture 32 is located in the first plate 12. Second aperture 32 may be preferably sized to fit a hook of a ratchet strap. Wide portion 14a of guiding aperture 14 is preferably sized to also fit a ratchet strap hook such that guiding aperture 14 and second aperture 32 can be used in combination to secure pipe, timbers, boards, and the like with ratchet straps. Alternatively, aperture 14 may be used to in conjunction with chains, ropes, or cables to secure goods to the hitch ball locking plate 10. In addition, the second aperture 32 also reduces the weight of the hitch ball locking plate 10.

A plurality of lockdown apertures 30 are provided in a spaced configuration around a peripheral edge of the first plate 12. The lockdown apertures 30 allow a lock arm to be inserted therethrough, for instance, also passing through a chain to lock a piece of equipment to the hitch ball locking plate 10. Alternatively, a rope may be placed through the lockdown apertures 30 and tied to a piece of equipment. The size of the lockdown apertures may vary such that chains, bolt clevises, hooks, or the like may be used with the lockdown apertures.

At least one aperture is provided as a first pivoting or first pivot aperture 18, shown in FIG. 4. The first pivot aperture 18 is aligned with a second pivot aperture 22 on locking bar 20. A screw and nut, rivet, or preferably, a bolt and nut 80,82 are placed through the aligned apertures 18 and 22 to provide a pivotable connection between the locking bar 22 and the first plate 12. Most preferably, the nut 82 is welded to the bolt 80 and the edges of the bolt 80 are cut or ground off so that a thief can not use a wrench or ratchet tool to loosen the nut 82 and bolt 80. The locking bar 20 may be, substantially rectangular in shape having the second pivoting aperture 18 at a first distal end and a second lock aperture 24 at a second distal end. Of course one of ordinary skill in the art may utilize a number of known geometries for the locking bar and plate and these varying geometries are considered to fall within the teachings herein.

Along the upper edge of locking bar 20 closest to locking tab 16 is a beveled area 23. The beveled area or edge 23 is preferably also curved such that the locking bar 20 fits closely against the ball hitch 60 in a closed position. The locking bar 20 is preferably made of steel such as from a piece of flat bar stock. As one skilled in the art will recognize, the beveled edge 23 should also be opposing the beveled edge 16a of locking tab 16.

In the closed position second lock aperture 24 of the locking bar 20 is aligned with first lock aperture 26 in first plate 12. As shown in FIG. 3 a lock is placed through the aligned apertures 24,26 to secure the ball hitch locking plate 10 to ball hitch 60, and therefore a truck, trailer or the like.

In addition to the first plate 12 and pivotably connected locking bar 20 is a second plate 50, preferably welded to an upper surface of the first plate 12. The second plate 50 is integral with and centrally located on the first plate 12 and has a substantially circular removed portion 52. The removed portion 52 is located above the narrow portion 14b of guiding or positioning aperture 14. The removed portion 52 is operably communicating with narrow portion 14b of first aperture 14. As best seen in FIGS. 1 and 2, when ball hitch 60 is positioned in the narrow portion 14b of guiding or positioning aperture 14, ball hitch 60 moves within removed portion 52 of second plate 50.

Figure 3:
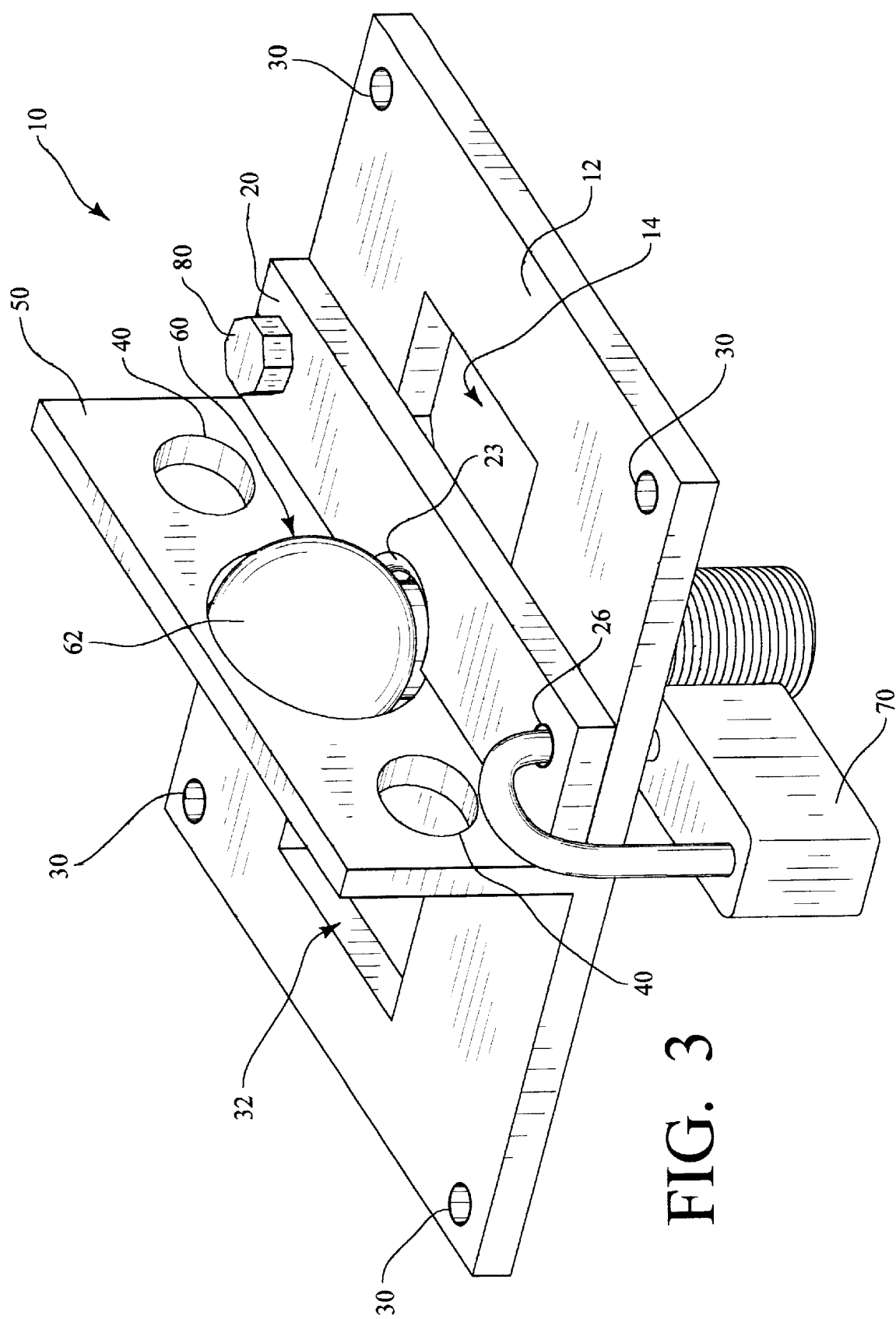
FIG. 3 shows a perspective view of the hitch ball locking plate of the present invention; and, FIG. 4 shows an assembly view of the hitch ball locking plate of the present invention.

The second plate 50 also has at least one aperture locking 40, and may have two as shown in FIGS. 3 and 4. The at least one locking aperture 40 is placed in the second plate 50 for connecting chains, ropes, and the like between removable equipment or goods in the truck or trailer and the hitch ball locking plate 10.

A hitch ball 60 is also included in the device for connection to a truck bed or trailer. The hitch ball 60 has a head 62 at an upper end of a shaft preferably having a diameter of 2–5/16". At a lower end of the shaft are a plurality of threads 64 for connecting with a truck bed or trailer. Below the head 62 is a neck portion 63 having dimensions which allow it to fit within the narrow portion 14b of guiding or positioning aperture 14. When the hitch ball locking plate 10 is closed, one can see that the locking plate 10 is prevented from moving in three dimensions by the locking tab 16 and locking bar 20, first plate 12, and second plate 50. This, in turn, secures the locking plate 10 to the truck, trailer, or the like.

In operation, the hitch ball 60 is threadably attached to a truck bed or trailer. The threads 64 of the hitch ball 60 may be directly threaded into the bed of the truck or trailer or threaded into a nut located beneath the bed of the truck or trailer on an underside.

With the locking bar 20 pivoted to an open position away from second plate 50, the locking plate 10 is placed over the head 62 of hitch ball 60 with second plate 50 oriented in an upward position. The locking plate 10 is lowered on to the head 62 so that the head 62 extends through the wide portion 14a of guiding or positioning aperture 14. Next, the locking plate 10 is moved laterally so that the neck 63 of the hitch ball 60 is positioned within the narrowed portion 14b of the guiding aperture 14. The locking plate 10 should also be positioned so that the beveled portion 16a of locking tab 16 has a close fit against head 62 of ball hitch 60.

The locking bar 20 is next rotated to a closed position as shown in FIG. 3. The beveled edge 23 of locking bar 20 should be closely fit against the head 62 of the hitch ball 60 opposite locking tab 16. With first lock aperture 26 and second lock aperture 24 aligned, a lock 70 is placed through both apertures and locked. In this position the lock 70 keeps the locking bar 20 in close relation with the hitch ball 60. In addition equipment and goods in the bed of the truck or trailer can be attached by chain, rope, or other means to the locking plate 10.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A hitch ball locking plate, comprising:
   a first plate having a positioning aperture;
   a locking bar attached to said first plate;
   a second plate integral with said first plate and normal to said first plate;
   wherein said second plate is centrally aligned across said first plate and above a narrow portion of said positioning aperture.

2. The hitch ball locking plate of claim 1, wherein said second plate has at least one aperture and one substantially semi-circular removed portion.

3. The hitch ball locking plate of claim 1, further comprising a first lock aperture in said first plate and a second lock aperture on said locking bar in alignment with said first lock aperture.

4. The hitch ball locking plate of claim 1, wherein said positioning aperture is centrally located on said first plate.

5. The hitch ball locking plate of claim 1, wherein said locking bar is pivotably attached to said first plate.

6. The hitch ball locking plate of claim 1, a locking tab adjacent a narrow portion of said positioning aperture.

7. The hitch ball locking plate of claim 1, further comprising a plurality of lockdown apertures in a spaced configuration around a peripheral edge of said first plate.

8. A hitch ball locking plate, comprising:
   a first plate having a positioning aperture located thereon;
   said positioning aperture having a wide portion and a narrow portion;
   a locking bar attached to said first plate and having a look aperture opposite a pivotable connection; and,
   a locking tab adjacent said narrow portion of said first plate.

9. The hitch ball locking plate of claim 8, further comprising a nut and a bolt for pivotably attaching said locking bar to said first plate.

10. The hitch ball locking plate of claim 8, further comprising a second plate integral with said first plate, said second plate centrally aligned on and extending normally across said first plates.

11. The hitch ball locking plate of claim 8, wherein a second plate has at least one locking aperture.

12. The hitch ball locking plate of claim 8, wherein a second plate has a substantially semi-circular removed portion.

13. The hitch ball locking plate of claim 12, wherein said substantially semi-circular removed portion is extending over said narrow portion.

14. The hitch ball locking plate of claim 8, further comprising a plurality of lockdown apertures in a spaced configuration around a peripheral edge of said first plate.

15. A hitch ball locking plate, comprising:
   a first plate having a first guiding aperture, said first guiding aperture being located on said first plate;
   a locking bar connected to said first plate; and,
   a second plate aligned on and normal to said first plate having a removed portion operably communicating with said guiding aperture;
   wherein said locking bar is pivotably attached to said first plate.

16. The hitch ball locking plate of claim 15, further comprising a locking tab adjacent a narrow portion of said guiding aperture.

17. The hitch ball locking plate of claim 16, said locking tab and said locking bar each having a beveled edge for positioning adjacent a ball hitch.

18. The hitch ball locking plate of claim 15, wherein said first guiding aperture has a wide portion and a narrow portion.

19. The hitch ball locking plate of claim 15, wherein said second plate has at least one aperture.

20. The hitch ball locking plate of claim 15, further comprising a plurality of lockdown apertures in a spaced configuration around a peripheral edge of said first plate.

21. A hitch ball locking plate, comprising:
   a first plate having a first aperture positioned therethrough;
   a locking tab adjacent a narrow portion of said first aperture;
   a locking bar attached to said first plate;
   a second plate having a removed portion aligned with said first aperture, said second plate extending across said first plate;
   said second plate having at least one aperture for securing equipment thereto; and,
   a ball hitch, having a head positioned within said removed portion of said second plate and a shaft extending through said guiding aperture.

22. The hitch ball locking plate of claim 21, wherein said locking bar and said locking tab each have an opposed beveled edge.

23. The hitch ball locking plate of claim 21, wherein said locking bar and said first plate each have an aligned locking bar aperture.

24. The hitch ball locking plate of claim 21, further comprising a plurality of lockdown apertures in a spaced configuration around a peripheral edge of said first plate.

25. The hitch ball locking plate of claim 21, wherein said locking bar is pivotably attached to said first plate by a bolt and a nut, said nut being welded to said bolt.

26. A hitch ball locking plate, comprising:
   a first plate having a positioning aperture centrally located on said first plate;
   said positioning aperture having a wide portion and a narrow portion;
   a locking tab adjacent said narrow portion of said first plate;
   a locking bar pivotably attached to said first plate and having a first locking aperture;
   said locking tab and said locking bar having opposed beveled edges;
   a second plate integral with and normal to said first plate having a removed portion operably communicating with said positioning aperture;
   said the second plate having at least one aperture for securing equipment thereto;
   said first plate having a plurality lockdown apertures; and,
   a ball hitch, having a head positioned within said removed portion of said second plate and a shaft extending through said guiding aperture.

27. The hitch ball locking plate of claim 26 further comprising a bolt and a nut for pivotably attaching said first plate and said locking bar.

28. The hitch ball locking plate of claim 27 further comprising a lock placed through said first locking aperture.

* * * * *